(No Model.)

A. NICKERSON.
HAMMOCK SPREADER.

No. 369,546. Patented Sept. 6, 1887.

WITNESSES.
Matthew M. Blunt,
Herbert Steele.

INVENTOR.
Amos Nickerson
per Frank G. Parker Atty.

UNITED STATES PATENT OFFICE.

AMOS NICKERSON, OF SOMERVILLE, MASSACHUSETTS.

HAMMOCK-SPREADER.

SPECIFICATION forming part of Letters Patent No. 369,546, dated September 6, 1887.

Application filed January 31, 1887. Serial No. 226,088. (No model.)

*To all whom it may concern:*

Be it known that I, AMOS NICKERSON, of Somerville, in the county of Middlesex and State of Massachusetts, have invented a new and useful Improvement in Hammock-Spreaders, of which the following, taken in connection with the accompanying drawings, is a specification.

My invention has for its object to so improve the spreader that the cords can be easily arranged in connection with the notches of the spreader, so as to be held each in its respective place, and so that they will not get free from their holding-sockets by any use to which the hammock may be put, or by any accidental cause. This object I attain by the mechanism shown in the accompanying drawings, in which—

Figure 1:
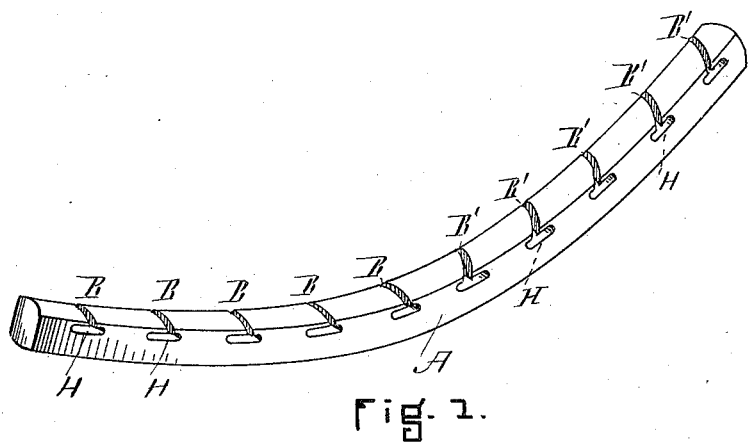
Figure 2:
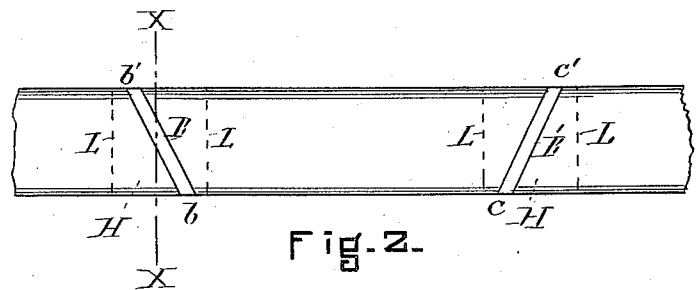
Figure 3:
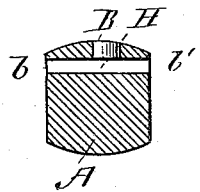

Figure 1 is a perspective view of one of my spreaders. Fig. 2 is a plan showing a part of the same, and Fig. 3 is a cross-section taken on line $x\ x$ of Fig. 2.

My present invention is an improvement on the device shown in the patent granted to me June 16, 1885, No. 320,276, and entitled "hammock-spreader."

The spreader A is made preferably of wood, although other material may be used, if thought desirable. The cord-holding notches of the spreader are formed by diagonal vertical kerfs, as shown at B B and B' B', Fig. 1. I think it best to form these diagonal kerfs inclined to the left on the left end of the spreader and to the right on the right end of the spreader, so that they will be better adapted to hold the cords in place, as the lateral strain of the cords is naturally from the outside toward the center. Thus the kerf B, Fig. 2, is inclined to the left, as indicated at $b\ b'$, and the kerf B' is inclined to the right, as indicated at $c\ c'$. The bottom of each of the kerfs is extended laterally, as shown at $b\ b'$, Fig. 3. This lateral extension or mortise H is at right angles to the line of the spreader, as indicated by dotted lines L L, Fig. 2, or at least the mortise H should not be parallel to the kerfs B B B' B'. The object of this kind of holding-notches is to avoid any possibility of the cords while in the lower part of the notches becoming parallel to the kerfs, and thus springing out.

I claim—

A hammock-spreader provided with cord recesses or holding-notches made by kerfing, first, a diagonal slot, B, across the upper face of the spreader, and then mortising an elongated horizontal recess, H, substantially as described, and for the purpose set forth.

AMOS NICKERSON.

Witnesses:
FRANK G. PARKER,
MATTHEW M. BLUNT.